(12) United States Patent
Oury (10) Patent No.: US 8,709,636 B2
(45) Date of Patent: Apr. 29, 2014

(54) REPEATING FRAME BATTERY WITH JOINING OF CELL TABS VIA WELDED-ON MALE AND FEMALE SLIP-FIT CONNECTORS

(75) Inventor: Andrew P. Oury, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 671 days.

(21) Appl. No.: 12/844,182

(22) Filed: Jul. 27, 2010

(65) Prior Publication Data

US 2012/0028097 A1    Feb. 2, 2012

(51) Int. Cl.
*H01M 10/50* (2006.01)
*H01M 2/24* (2006.01)

(52) U.S. Cl.
USPC .......................... 429/120; 429/158; 429/160

(58) Field of Classification Search
USPC .......................................... 429/120, 158, 160
See application file for complete search history.

(56) References Cited

U.S. PATENT DOCUMENTS

| | | | |
|---|---|---|---|
| 2007/0207377 A1* | 9/2007 | Han et al. | 429/162 |
| 2008/0199765 A1* | 8/2008 | Yoon et al. | 429/91 |
| 2010/0144214 A1* | 6/2010 | Kruger et al. | 439/761 |

FOREIGN PATENT DOCUMENTS

| | | |
|---|---|---|
| DE | 102009016576 A1 | 11/2009 |
| WO | 2010081704 A2 | 7/2010 |

* cited by examiner

*Primary Examiner* — Kenneth Douyette
*Assistant Examiner* — James Lee
(74) *Attorney, Agent, or Firm* — Fraser Clemens Martin & Miller LLC; J. Douglas Miller (57) ABSTRACT

A repeating cell frame for a battery pack assembly is disclosed having a cooling module and a spacer module. The cooling module includes a frame having a first electrical connector and a second electrical connector disposed thereon, wherein a first battery cell includes a first electrically conductive tab in electrical communication with the first electrical connector and a second electrically conductive tab in electrical communication with the second electrical connector. The spacer module includes a frame having a third electrical connector and a fourth electrical connector disposed thereon, wherein a second battery cell includes a first electrically conductive tab in electrical communication with the third electrical connector and a second electrically conductive tab in electrical communication with the fourth electrical connector. The third electrical connector of the spacer module is releasably joined to the second electrical connector of the cooling module to form the repeating cell frame.

20 Claims, 6 Drawing Sheets

REPEATING FRAME BATTERY WITH JOINING OF CELL TABS VIA WELDED-ON MALE AND FEMALE SLIP-FIT CONNECTORS

FIELD OF THE INVENTION

The present disclosure relates to a battery pack and more particularly to a battery pack assembly for housing battery cells.

BACKGROUND OF THE INVENTION

A battery cell has been proposed as a clean, efficient and environmentally responsible power source for an electric device such as an electric vehicle, for example. Typically, a plurality of individual battery cells such as lithium-ion battery cells, for example, is provided to supply an amount of electric power sufficient to operate the electric device. The plurality of individual battery cells must be physically supported and protected, as well as be in electrical communication with each other and the electrical device. Further, it is often desired to provide cooling to the battery cells during a charging and a discharging thereof and venting to the battery cells to exhaust gasses, liquids, and solids that may be discharged therefrom.

A battery pack assembly is typically provided to support and protect the plurality of battery cells and facilitate placing the battery cells in electrical communication with each other and the associated electrical device. The battery pack assembly will often provide a cooling system to militate against undesirable overheating of the battery cells and a venting system to exhaust gasses, liquids, and solids that may be discharged from the battery cells. To provide such desired electrical communication, cooling, and venting, a complexity and cost of the battery pack assembly is undesirably increased.

Additionally, it is desirable to mechanically and electrically connect adjacent individual battery cells with each other with a low electrical resistance connection, on the order of 30 micro-Ohms. It is also desirable to provide a voltage sensing lead from each terminal of the individual battery so that electrical hardware can measure and adjust (via cell balancing) the voltage of each cell. Further, it is desirable to produce a battery pack assembly for housing a plurality of battery cells, wherein an ease of manufacturing the battery pack assembly is maximized and a cost thereof is minimized.

SUMMARY OF THE INVENTION

Compatible and attuned with the present invention, a battery pack assembly for housing a plurality of battery cells providing electrical connections between individual battery cells and between the battery pack assembly and an associated electrical device, wherein an ease of manufacturing the battery pack assembly is maximized and a cost thereof is minimized, has been surprisingly discovered.

In one embodiment, a repeating cell frame for a battery pack assembly comprises a cooling module having a frame including a cooling fin disposed thereon, a first electrical connector and a second electrical connector disposed on the frame of the cooling module, wherein a first battery cell abuts the cooling fin and includes a first electrically conductive tab in electrical communication with the first electrical connector and a second electrically conductive tab in electrical communication with the second electrical connector; and a spacer module having a frame including a third electrical connector and a fourth electrical connector disposed thereon, wherein a second battery cell includes a first electrically conductive tab in electrical communication with the third electrical connector and a second electrically conductive tab in electrical communication with the fourth electrical connector, the third electrical connector of the spacer module releasably joined to the second electrical connector of the cooling module causing electrical communication between the first battery cell and the second battery cell and placing the cooling module and the spacer module in a stacked relation to form the repeating cell frame assembly.

In another embodiment, a battery pack assembly comprises a cooling module having a frame including a first side and a second side, a first electrical connector and a second electrical connector disposed on the frame of the cooling module, wherein a first battery cell abuts the first side of the frame and includes a first electrically conductive tab in electrical communication with the first electrical connector and a second electrically conductive tab in electrical communication with the second electrical connector; a spacer module having a frame including a first side, a second side and an opening formed in the central portion thereof, a third electrical connector and a fourth electrical connector disposed on the frame of the spacer module, wherein a second battery cell includes a first electrically conductive tab in electrical communication with the third electrical connector and a second electrically conductive tab in electrical communication with the fourth electrical connector and at least a portion of the second battery cell received in the opening formed in the frame of the spacer module, the third electrical connector of the spacer module releasably joined to the first electrical connector of the cooling module placing the cooling module and the spacer module in a stacked relation, wherein the first side of the cooling module faces the second side of the spacer module and first battery cell abuts the second battery cell; a start frame including a first side and a second side, a fifth electrical connector and a sixth electrical connector disposed on the first side of the start frame, wherein a third battery cell includes a first electrically conductive tab in electrical communication with the fifth electrical connector and a second electrically conductive tab in electrical communication with the sixth electrical connector, the sixth electrical connector of the start frame releasably joined to the second electrical connector of the cooling frame placing the cooling module and start frame in the stacked relation, wherein the first side of the start frame faces the second side of the cooling module and the third battery cell abuts the second side of the cooling module; a stop frame including a first side and a second side, a seventh electrical connector and an eighth electrical connector disposed on the first side of the stop frame, wherein a fourth battery cell abuts a first side of the stop frame and includes a first electrically conductive tab in electrical communication with the seventh electrical connector and a second electrically conductive tab in electrical communication with the eighth electrical connector, the eighth electrical connector of the stop frame releasably joined to the fourth electrical connector of the spacer module placing the spacer module and stop frame in the stacked relation, wherein the first side of the spacer module faces the second side of the stop frame; and an end frame disposed on and substantially covering the first side of the stop frame.

In another embodiment, a battery pack assembly comprises a plurality of repeating cell frames, each repeating cell frame including a cooling module having a frame including a first side and a second side, a first electrical connector and a second electrical connector disposed on the frame of the cooling module, wherein a first battery cell abuts the first side of the frame and includes a first electrically conductive tab in electrical communication with the first electrical connector and a second electrically conductive tab in electrical communication with the second electrical connector; and a spacer module having a frame including a first side, a second side and an opening formed in the central portion thereof, a third electrical connector and a fourth electrical connector disposed on the frame of the spacer module, wherein a second battery cell includes a first electrically conductive tab in electrical communication with the third electrical connector and a second electrically conductive tab in electrical communication with the fourth electrical connector and at least a portion of the second battery cell received in the opening formed in the frame of the spacer module, the third electrical connector of the spacer module releasably joined to the first electrical connector of the cooling module to form one of the repeating cell frames, wherein the first side of the cooling module faces the second side of the spacer module and the first battery cell abuts the second battery cell, and the fourth electrical connector of the spacer module is removably releasably joined to the second electrical connector of a cooling module in an adjacent repeating cell frame placing the repeating cell frames in a stacked relation, wherein the first side of the spacer module of one repeating cell frame faces the second side of the cooling module in the adjacent repeating cell frame; a start frame including a first side and a second side, a fifth electrical connector and a sixth electrical connector disposed on the first side of the start frame, wherein a third battery cell includes a first electrically conductive tab in electrical communication with the fifth electrical connector and a second electrically conductive tab in electrical communication with the sixth electrical connector, the sixth electrical connector of the start frame removably releasably joined to the second electrical connector of the cooling frame of the repeating cell frame, wherein the first side of the start frame faces the second side of the cooling module and the third battery cell abuts the second side of the cooling module; a stop frame including a first side and a second side, a seventh electrical connector and an eighth electrical connector disposed on the first side of the stop frame, wherein a fourth battery cell abuts the first side of the stop frame and includes a first electrically conductive tab in electrical communication with the seventh electrical connector and a second electrically conductive tab in electrical communication with the eighth electrical connector, the eighth electrical connector of the stop frame releasably joined to the fourth electrical connector of the spacer module of the adjacent repeating cell frame, wherein the first side of the spacer module faces the second side of the stop frame; and an end frame disposed on and substantially covering the first side of the stop frame.

BRIEF DESCRIPTION OF THE DRAWINGS

The above, as well as other advantages of the present invention will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
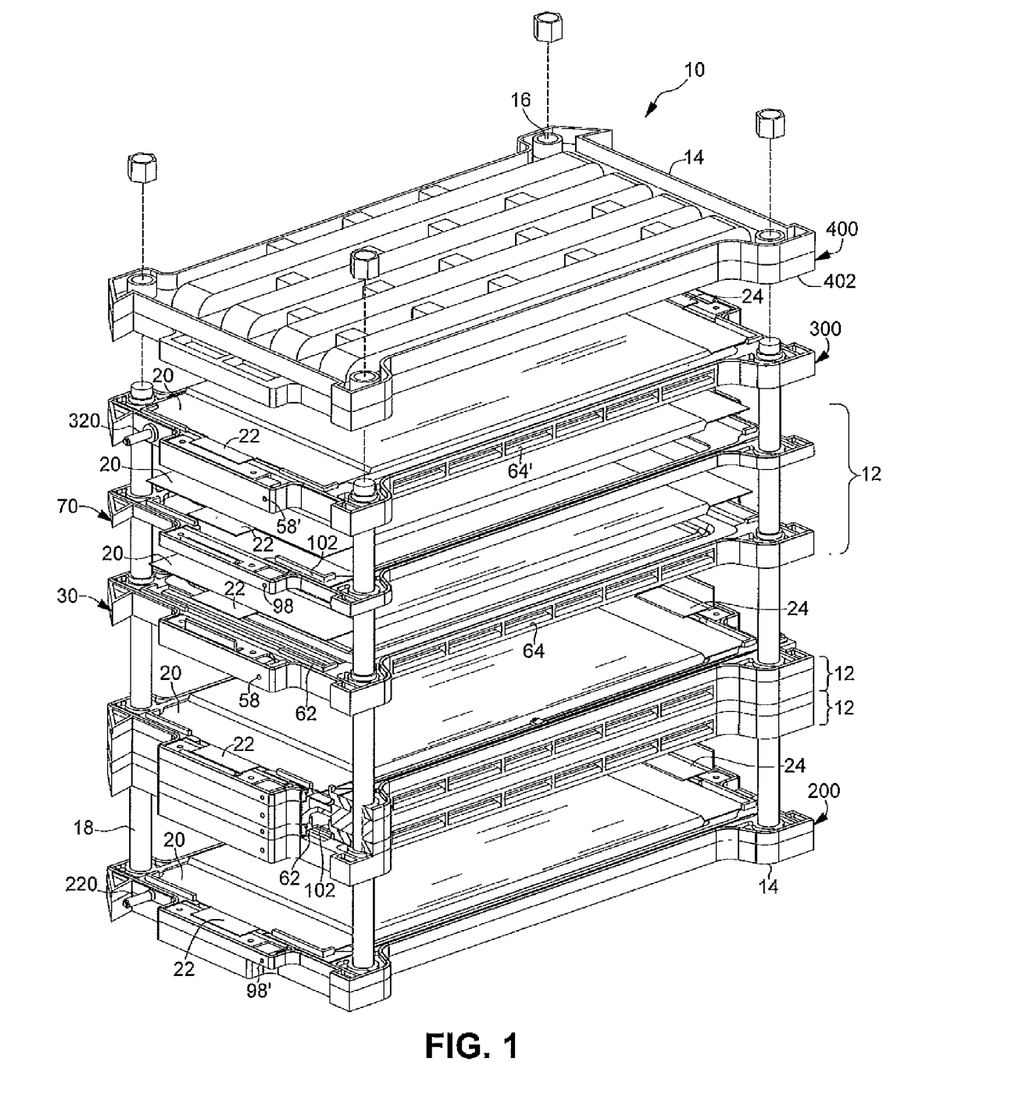
FIG. 1 is a partially exploded perspective view of a battery pack assembly according to the present disclosure, showing a plurality of repeating cell frames having a cooling module and a spacer module interposed between a start frame and a stop frame and showing a portion thereof in section.

FIG. 1 shows a battery pack assembly 10 according to an embodiment of the present disclosure for supplying electric power to an associated electric device such as an electric vehicle, for example. The battery pack assembly 10 includes a plurality of repeating cell frames 12 having a cooling module 30 and a spacer module 70 arranged in a stacked relation. A battery cell 20 is coupled to each of the modules 30, 70. In the illustrated embodiment, the battery cell 20 is a prismatic lithium ion (Li-ion) battery cell having a first electrically conductive tab 22 and a second electrically conductive tab 24 extending outwardly therefrom. It should be understood that other battery cells, employing a different structure and electrochemistry, may also be used. It should be further understood that the battery pack assembly 10 can include a selected number of the repeating cell frames 12 and the battery cells 20 to deliver a desired amount of electric power to the associated electric device. A start frame 200 is disposed adjacent a first end of the battery pack assembly 10. A stop frame 300 is disposed adjacent a second end of the battery pack assembly 10. The start frame 200 and the stop frame 300 each include one of the battery cells 20 coupled thereto. An end frame 400 is disposed on the stop frame 300 to substantially cover the adjacent stop frame 300 and the associated batter cell 20. End plates 14 are disposed on the opposing ends of battery pack assembly 10, wherein one of the end plates 14 abuts the start frame 200 and another of the end plates 14 abuts the end frame 400. The end plates 14 are formed from a rigid material such as a metal and a plastic, for example, to facilitate maintaining the start frame 200, the repeating cell frames 12, the stop frame 300, and the end frame 400 in the stacked relation. Apertures 16 are formed in each of the start frame 200, the repeating cell frames 12, the stop frame 300, the end frame 400, and the end plates 14 adjacent a peripheral edge thereof. The apertures 16 cooperate to receive a tension rod 18 therethrough. The tension rod 18 extends from the first end to the second end of the battery pack assembly 10 to hold the start frame 200, the repeating cell frames 12, the stop frame 300, the end frame 400, and the end plates 14 under compression in the stacked relation. It should be understood that the start frame 200, the repeating cell frames 12, the stop frame 300, the end frame 400, and the end plates 14 can be held under compression employing tension straps, tension bands, clamps, and the like. In the illustrated embodiment, the battery pack assembly 10 includes a single series of the start frame 200, the repeating cell frames 12, the stop frame 300, and the end frame 400 disposed between the end plates 14 in the stacked relation. It should also be understood that the battery pack assembly 10 can include two or more series of the start frame 200, the repeating cell frames 12, the stop frame 300, and the end frame 400 disposed between the end plates 14.

Figure 2:
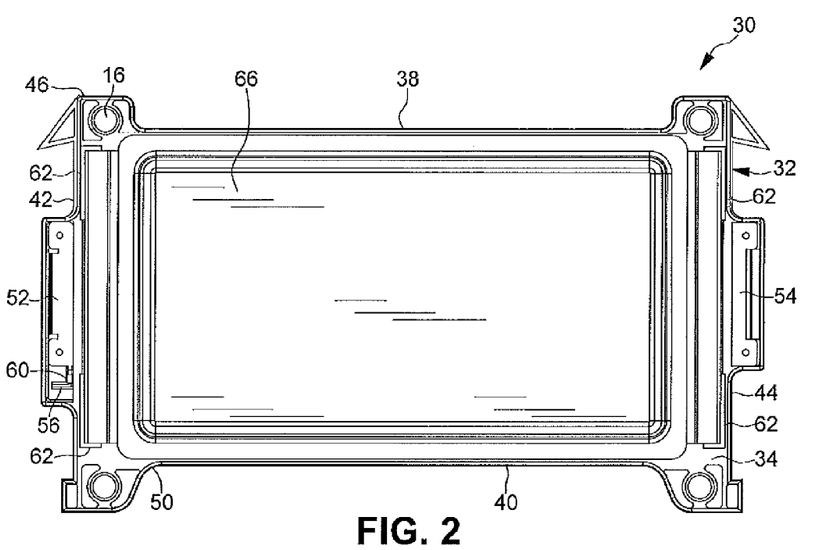
FIG. 2 is a plan view of a first side of the cooling module shown in FIG. 1.
Figure 3:
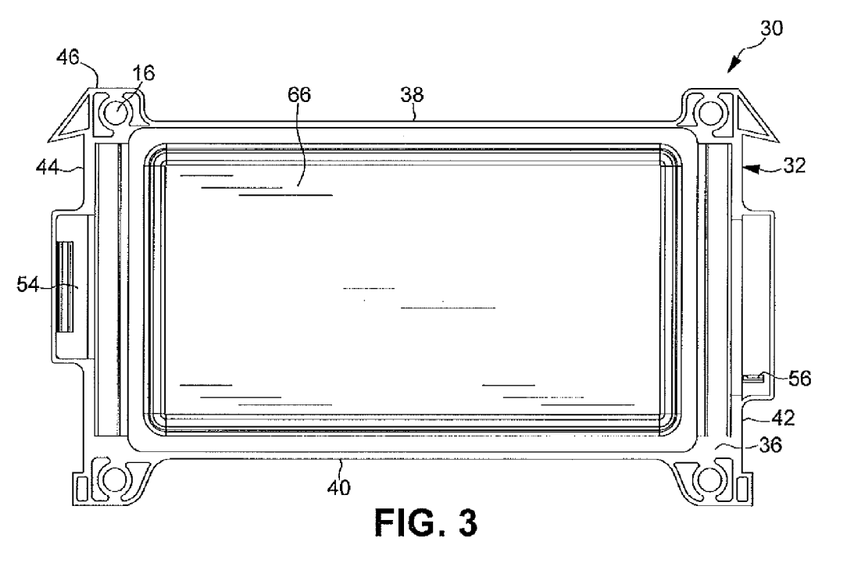
FIG. 3 is a plan view of a second side of the cooling module shown in FIG. 1.

The cooling module 30 of the repeating cell frame 12, more clearly shown in FIGS. 2-3, includes a frame 32 having a first side 34 and a second side 36. The frame 32 includes a first leg 38, a second leg 40, a third leg 42, and a fourth leg 44 forming an opening (not shown) through the central portion of the frame 32. In the illustrated embodiment, the frame 32 and the opening have a generally rectangular shape. It should be understood that the frame 32 and the opening may have other shapes such as square, circular, oval, and the like, for example, to accommodate a shape of the battery cell 20 and a fitment with the associated electrical device. The frame 32 can be formed as a unitary frame by injection molding a material such as a nylon, polypropylene, metal, or other material having suitable physical and chemical properties, for example. Ears 46 are formed adjacent each corner of the frame 32. One of the apertures 16 is formed in each of the ears 46.

A first seal member 50 is disposed on the first side 34 of the frame 32 adjacent an outer peripheral edge thereof. It should be understood that the first seal member 50 may be disposed on the second side 36 of the frame 32. The first seal member 50 facilitates forming a substantially media tight seal adjacent the peripheral edge of the frame 32. The first seal member 50 can be formed from a material dispensed onto the frame 32 or preformed from a gasket material. An adhesive, or the like, can be employed to couple the first seal member 50 to the frame 32.

A first electrical connector 52 is disposed on the third leg 42 on the first side 34 of the frame 32 between the first seal member 50 and the opening. A second electrical connector 54 is disposed on the fourth leg 44 on the first side 34 of the frame 32 between the first seal member 50 and the opening. The first electrical connector 52 and the second electrical connector 54 are adapted to be coupled with the tabs 22, 24, respectively, of the battery cell 20. In the illustrated embodiment, the first electrical connector 52 is a male connector extending outwardly from the first side 34 of the frame 32 and the second electrical connector 54 is a female connector having a receiving portion facing outwardly from the second side 36 of the frame 32. It should be understood that the first electrical connector 52 can be a female connector and the second electrical connector 54 can be a male connector. The tabs 22, 24 of the battery cell 20 and the electrical connectors 52, 54 are formed of a material such as an aluminum, a clad aluminum, a copper, or other electrically conductive material having suitable properties, for example, to facilitate a low electrical resistance connection therebetween, on the order of about 30 micro-Ohms. The tabs 22, 24 of the battery cell 20 can be coupled to the respective electrical connectors 52, 54 by resistance welding, laser welding, ultrasonic welding, soldering, brazing, and other coupling methods now known or later developed, for example, to obtain the low electrical resistance connection therebetween. Typically, the tabs 22, 24 are formed from different materials and the electrical connectors 52, 54 are formed from different materials, wherein the tab 22 and the first electrical connector 52 are formed from the same material and the tab 24 and the second electrical connector 54 are formed from the same material to facilitate forming the low electrical resistance welded connection therebetween. It should be understood that other combinations of materials can be used for the tabs 22, 24 and the electrical connectors 52, 54. The tabs 22, 24 of the battery cell 20 and the electrical connectors 52, 54 can be provided with a coating such as a tin coating, a silver coating, and a gold coating, for example, to facilitate forming low electrical resistance connections with the tabs 22, 24 and the electrical connectors 52, 54. It should be understood that the electrical connectors 52, 54 can be integrally formed with the tabs 22, 24, wherein the electrical connectors 52, 54 can be coupled to the respective legs 42, 44 of the frame 32 employing a snap-fit or other suitable connection. Integrally forming the electrical connectors 52, 54 and the cell tabs 22, 24 can eliminate the step of welding the cell tabs 22, 24 to the electrical connectors 52, 54, respectively, and minimize electrical resistance therebetween.

A first voltage sensing lead 56 extends outwardly from a peripheral edge of the third leg 42 of the frame 32. In the illustrated embodiment, the first voltage sensing lead 56 is a male pin style lead. It should be understood that the first voltage sensing lead 56 may be another type of lead facilitating an electrical connection therewith. One end of the first voltage sensing lead 56 is in electrical communication with the first electrical connector 52 and an opposite end extends from the third leg 42 of the frame 32 to form a first terminal 58 for receiving an electrical connector (not shown), as is known in the art, to provide electrical communication between the first terminal 58 and a control system (not shown) adapted to monitor and control an operation of the battery pack assembly 10. The first voltage sensing lead 56 may include a first current limiting device 60, such as a fuse, for example, to militate against an undesired current from flowing therethrough.

Figure 9:
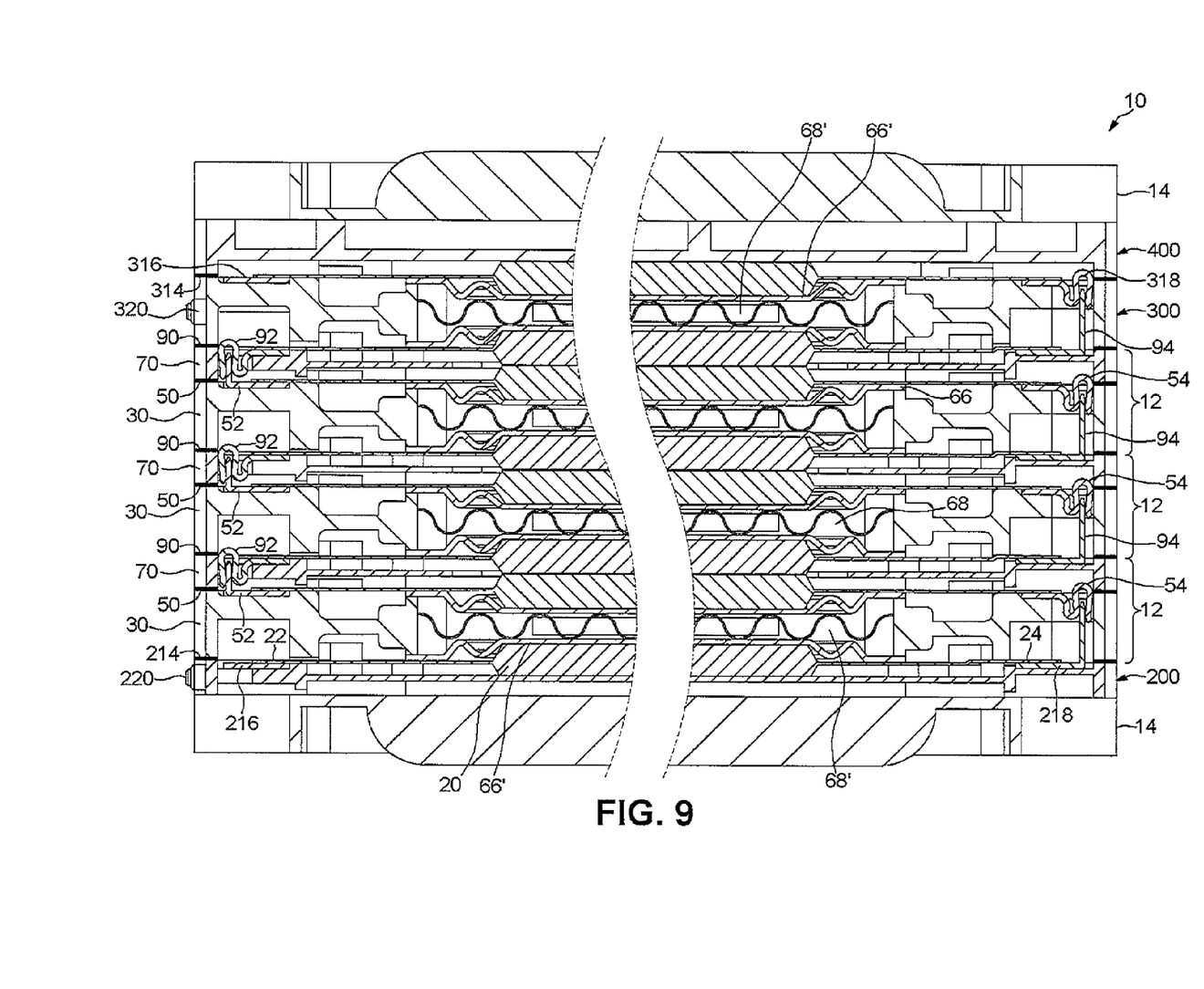
FIG. 9 is an enlarged fragmentary cross-sectional side elevational view of the battery pack assembly shown in FIG. 1 showing a plurality of electrical connectors of the repeating cell frames, the start frame, and the stop frame coupled together.

Wall sections 62 are formed on the first side 34 of the frame 32 adjacent the corners thereof. As shown in the sectioned portion of FIG. 1, the wall sections 62 of the frame 32 abut the adjacent spacer module 70. Additionally, the wall sections 62 facilitate positioning the battery cells 20 in a desired position in respect of the frame 32. A plurality of slots 64 is formed in the first leg 38 and the second leg 40 of the frame 32. The slots 64 provide fluid communication through the legs 38, 40. A cooling fin 66 is disposed on the frame 32 substantially covering the opening formed therein. A plurality of flow channels 68, more clearly shown in FIG. 9, is formed in an interior of the cooling fin 66. The flow channels 68 extend between opposing edges of the cooling fin 66 and are in fluid communication with the slots 64 formed in the legs 38, 40 of the frame 32. In the illustrated embodiment, the cooling fin 66 is a corrugated cooling fin as described in commonly owned U.S. patent application Ser. No. 12/789,888, filed May 28, 2010, hereby incorporated herein by reference in its entirety. It should be understood that other types of cooling fins may be employed as desired. Each of the battery cells 20 in the battery pack assembly 10 is in thermal contact with at least one of the cooling fins 66 therein, wherein the cooling fins 66 facilitate a transfer of heat energy to or from the battery cells 20 to facilitate maintaining a desired temperature thereof.

Figure 4:
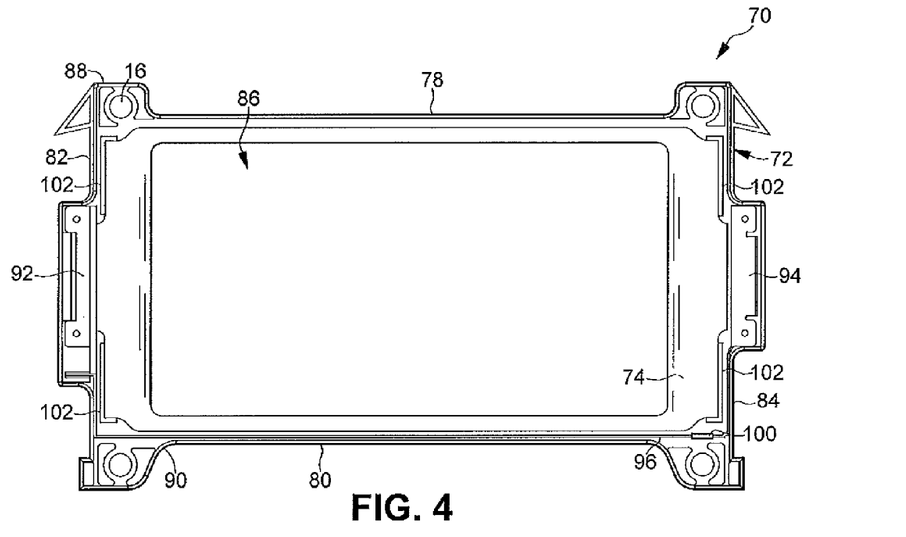
FIG. 4 is a plan view of a first side of the spacer module shown in FIG. 1.
Figure 5:
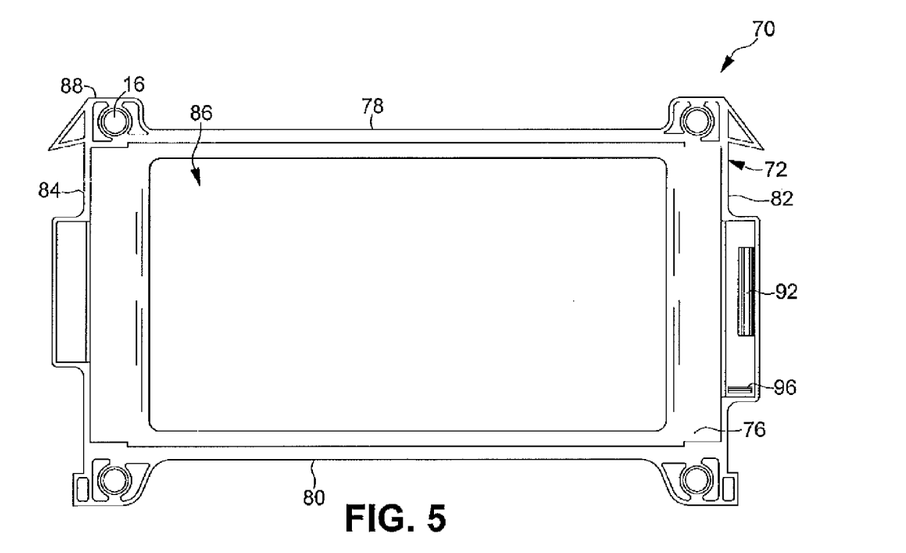
FIG. 5 is a plan view of a second side of the spacer module shown in FIG. 1.

The spacer module 70 of the repeating cell frames 12, more clearly shown in FIGS. 4-5, includes a frame 72 having a first side 74 and a second side 76. The frame 72 includes a first leg 78, a second leg 80, a third leg 82, and a fourth leg 84 forming an opening 86 through a central portion of the frame 72. In the illustrated embodiment, the frame 72 and the opening 86 have a generally rectangular shape to substantially match the shape of the cooling module 30. It should be understood that the frame 72 and the opening 86 may have other shapes such as square, circular, oval, and the like, for example, to substantially match similar shapes employed for the cooling module 30. The frame 72 can be formed as a unitary frame by injection molding a material such as a nylon, polypropylene, metal, or other material having suitable physical and chemical properties, for example. Ears 88 are formed adjacent each corner of the frame 72. One of the apertures 16 is formed in each of the ears 88.

A second seal member 90 is disposed on the first side 74 of the frame 72 adjacent an outer peripheral edge thereof. It should be understood that the second seal member 90 may be disposed on the second side 76 of the frame 72. The second seal member 90 facilitates forming a substantially media tight seal adjacent the peripheral edge of the frame 72. The second seal member 90 can be formed from a material dispensed onto the frame 72 or preformed from a gasket material. An adhesive, or the like, can be employed to couple the second seal member 90 to the frame 72.

A third electrical connector 92 is disposed on the third leg 82 on the first side 74 of the frame 72 between the second seal member 90 and the opening 86. A fourth electrical connector 94 is disposed on the fourth leg 84 on the first side 74 of the frame 72 between the second seal member 90 and the opening 86. The third electrical connector 92 and the fourth electrical connector 94 are adapted to be coupled with the tabs 22, 24, respectively, of the battery cell 20. In the illustrated embodiment, the third electrical connector 92 is a female connector having a receiving portion facing outwardly from the second side 76 of the frame 72 adapted to slip-fit or snap-fit together with the male first electrical connector 52 of the cooling module 30 and the fourth electrical connector 94 is a male connector extending outwardly from the first side 74 of the frame 72 adapted to slip-fit or snap-fit together with the female second electrical connector 54 of the cooling module 30 in an adjacent repeating cell frame 12. It should be understood that the third electrical connector 92 can be a male connector adapted to slip-fit or snap-fit together with a female connector and the fourth electrical connector 94 can be a female connector adapted to slip-fit or snap-fit together with a male connector. The electrical connectors 92, 94 are formed of a material such as an aluminum, a clad aluminum, a copper, or other electrically conductive material having suitable properties, for example, to facilitate a low electrical resistance connection with the tabs 22, 24 of the battery cells 20 and the electrical connectors 52, 54 of the cooling module 30, on the order of about 30 micro-Ohms. The tabs 22, 24 of the battery cell 20 can be coupled to the respective electrical connectors 92, 94 by resistance welding, laser welding, ultrasonic welding, soldering, brazing, and other coupling methods now known or later developed, for example, to obtain the low electrical resistance connection therebetween. Typically, the tabs 22, 24 are formed from different materials and the electrical connectors 92, 94 are formed from different materials, wherein the tab 22 and the third electrical connector 92 are formed from the same material and the tab 24 and the fourth electrical connector 94 are formed from the same material to facilitate forming the low electrical resistance welded connection therebetween. It should be understood that other combinations of materials can be used for the tabs 22, 24 and the electrical connectors 92, 94. The tabs 22, 24 of the battery cell 20 and the electrical connectors 92, 94 can be provided with a coating such as a tin coating, a silver coating, and a gold coating, for example, to facilitate forming low electrical resistance connections with the tabs 22, 24 and the electrical connectors 52, 54. It should be understood that the electrical connectors 92, 94 can be integrally formed with the cell tabs 22, 24, wherein the electrical connectors 92, 94 can be coupled to the respective legs 82, 84 of the frame 72 employing a snap-fit or other suitable connection. Integrally forming the electrical connectors 92, 94 and the cell tabs 22, 24 can eliminate the step of welding the cell tabs 22, 24 to the electrical connectors 92, 94 and minimize electrical resistance therebetween. The first electrical connector 52 and the third electrical connector 92 cooperate to join together the cooling module 30 and the spacer module 70 in a stacked relation to form the repeating cell frame 12, wherein the first side 34 of the frame 32 of the cooling module 30 faces the second side 76 of the frame 72 of the spacer module 70 and the first seal member 50 forms a substantially media tight seal therebetween. The fourth electrical connector 94 of the spacer module 70 in one repeating cell frame 12 cooperates with the second electrical connector 54 of the cooling module 30 of an adjacent repeating cell frame 12 to join together the spacer module 70 of one repeating cell frame 12 to the cooling module 30 of another repeating cell frame 12, wherein the first side 74 of the frame 72 of the spacer module 70 faces the second side 36 of the frame 32 of the cooling module 30 of the adjacent repeating cell frame 12 and the second seal member 90 forms a substantially media tight seal therebetween. It should be understood that a selected number of repeating cell frames 12 can be joined together to deliver a desired amount of electric power to the associated electric device. Further, the electrical connectors 52, 54, 92, 94 place the respective battery cells 20 in electrical communication, wherein the electrical resistance between the battery cells 20 is minimized.

A second voltage sensing lead 96 extends outwardly from a peripheral edge of the third leg 82 of the frame 72. In the illustrated embodiment, the second voltage sensing lead 96 is a male pin style lead. It should be understood that the second voltage sensing lead 96 may be another type of lead facilitate an electrical connection therewith. One end of the second voltage sensing lead 96 is in electrical communication with the fourth electrical connector 94. The second voltage sensing lead 96 extends from the fourth electrical connector 94 along the fourth leg 84, the second leg 80, and the third leg 82. It should be understood that the second voltage sensor 96 can extend along the fourth leg 84, the first leg 78, and the third leg 82. An opposite end the second voltage sensing lead 96 extends from the third leg 82 of the frame 72 to form a second terminal 98 for receiving an electrical connector (not shown), as is known in the art, to provide electrical communication between the second terminal 98 and a control system (not shown) adapted to monitor and control an operation of the battery pack assembly 10. The second voltage sensing lead 96 may include a second current limiting device 100, such as a fuse, for example, to militate against an undesired current from flowing therethrough.

Wall sections 102 are formed on the first side 74 of the frame 72 of the spacer module 70 adjacent the corners thereof. As shown in the sectioned portion of FIG. 1, the wall sections 102 of the frame 72 abut one of the adjacent cooling modules 30. It should be understood that the wall sections 102 abut the stop frame 300. Additionally, the wall sections 102 facilitate positioning the battery cells 20 in a desired position in respect of the frame 72.

Figure 6:
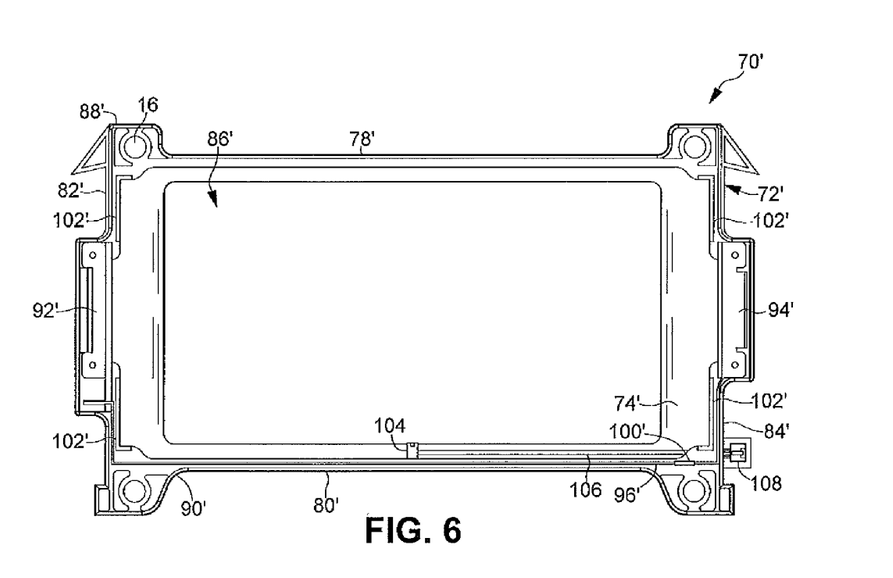
FIG. 6 is a plan view of a first side of the spacer module shown in FIG. 1 according to another embodiment of the invention showing a thermistor coupled thereto.

Optionally, as shown in FIG. 6, a thermistor 104 can be provided for the spacer module 70. Structure similar to that illustrated in FIGS. 4-5 includes the same reference numeral and a prime (') symbol for clarity. The thermistor 104 is disposed on the second leg 80' on the first side 74' of the frame 72' adjacent the opening 86' formed therein. An electrical lead 106 extends from the thermistor 104 along the second leg 80' and at least a portion of the fourth leg 84' and ends at a thermistor terminal 108 extending outwardly from a peripheral edge of the fourth leg 84'. It should be understood that the thermistor 104 can be disposed on the first leg 78', the third leg 82', and the fourth leg 94' of the frame 72' and that the thermistor terminal 108 can be provided at the first leg 78', the second leg 80', and the third leg 82' of the frame 72'. The electrical lead 106 provides electrical communication between the thermistor 104 and the thermistor terminal 108. An electrical connector (not shown) as is known in the art is provided to couple to the thermistor terminal 108 and provide electrical communication between the thermistor terminal 108 and the control system, wherein the thermistor 104 provides an electrical signal to the control system representative of a temperature within the battery pack assembly 10. The thermistor 104 can be provided for the first, the last, and at least one other spacer module 70 in the battery pack assembly 10 to monitor the temperature therein. It should be understood that fewer or additional spacer plates 70 can be provided with the thermistor 104, as desired. It should also be understood that the thermistor 104 can be provided for one or more of the cooling modules 30.

Figure 7:
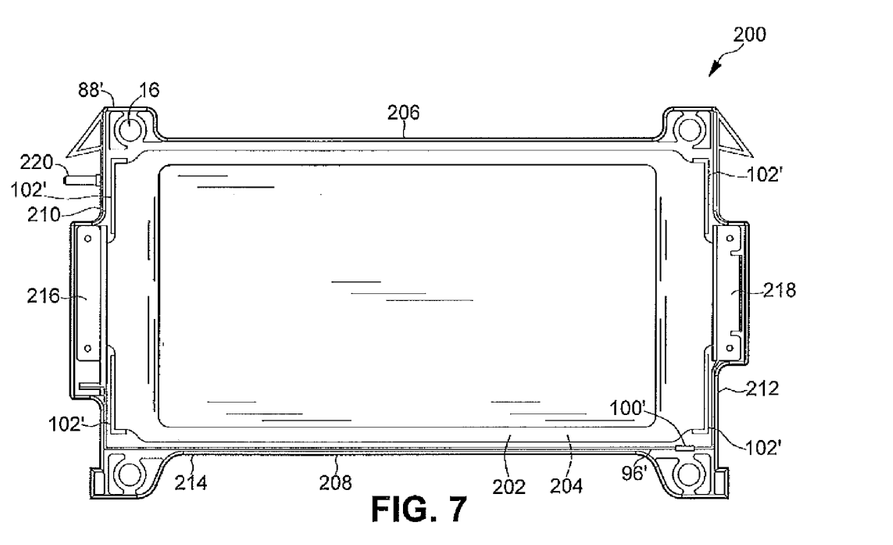
FIG. 7 is a plan view of a first side of the start frame shown in FIG. 1.

As shown in FIG. 1, the start frame 200 is disposed adjacent the first end of the battery pack assembly 10 and joined to the cooling module 30 of an adjacent repeating cell frame 12. Portions of the structure of the start frame 200, more clearly shown in FIG. 7, are similar to the structure of the spacer module 70 illustrated in FIGS. 1 and 4-5. Structure similar to the spacer module 70 includes the same reference numeral and a prime (') symbol for clarity. The start frame 200 includes a first side 202 and a second side 204. The start frame 200 includes a first edge 206, a second edge 208, a third edge 210, and a fourth edge 212 integrally formed and defining an outer periphery of the start frame 200. In the illustrated embodiment, the start frame 200 has a generally rectangular shape to substantially match the shape of the repeating cell frame 12. It should be understood that the start frame 200 may have other shapes such as square, circular, oval, and the like, for example, to substantially match similar shapes employed for the repeating cell frames 12. The start frame 200 can be formed as a unitary frame by injection molding a material such as a nylon, polypropylene, metal, or other material having suitable physical and chemical properties, for example.

A third seal member 214 is disposed on the first side 202 of the start frame 200 adjacent the outer periphery thereof. The third seal member 214 facilitates forming a substantially media tight seal adjacent the peripheral edge of the start frame 200. The third seal member 214 can be formed from a material dispensed onto the start frame 200 or preformed from a gasket material. An adhesive, or the like, can be employed to couple the third seal member 214 to the start frame 200.

A fifth electrical connector 216 is disposed on the first side 202 of the start frame 200 adjacent the third edge 210 thereof. A sixth electrical connector 218 is disposed on the first side 202 of the start frame 200 adjacent the fourth edge 212 thereof. The fifth electrical connector 216 and the sixth electrical connector 218 are adapted to be coupled with the tabs 22, 24, respectively, of the battery cell 20. In the illustrated embodiment, the fifth electrical connector 216 is a substantially planar plate and the sixth electrical connector 218 is a male connector extending outwardly from the first side 202 of the start frame 200 adapted to slip-fit or snap-fit together with the female second electrical connector 54 of the cooling module 30 of the adjacent repeating cell frame 12. It should be understood that the sixth electrical connector 218 can be a female connector adapted to slip-fit or snap-fit together with a male connector. The electrical connectors 216, 218 are formed of a material such as an aluminum, a clad aluminum, a copper, or other electrically conductive material having suitable properties, for example, to facilitate a low electrical resistance connection with the respective tabs 22, 24 of the battery cell 20 and the second electrical connector 54 of the cooling module 30 of the adjacent repeating cell frame 12, wherein the electrical resistance is on the order of about 30 micro-Ohms. The tabs 22, 24 of the battery cell 20 can be coupled to the respective electrical connectors 216, 218 by resistance welding, laser welding, ultrasonic welding, soldering, brazing, and other coupling methods now known or later developed, for example, to obtain the low electrical resistance connection therebetween. Typically, the tabs 22, 24 are formed from different materials and the electrical connectors 216, 218 are formed from different materials, wherein the tab 22 and the fifth electrical connector 216 are formed from the same material and the tab 24 and the sixth electrical connector 218 are formed from the same material to facilitate forming the low electrical resistance welded connection therebetween. It should be understood that other combinations of materials can be used for the tabs 22, 24 and the electrical connectors 216, 218. The tabs 22, 24 of the battery cell 20 and the electrical connectors 216, 218 can be provided with a coating such as a tin coating, a silver coating, and a gold coating, for example, to facilitate forming low electrical resistance connections with the tabs 22, 24 and the electrical connectors 216, 218. It should be understood that the electrical connectors 216, 218 can be integrally formed with the cell tabs 22, 24, wherein the electrical connectors 216, 218 can be coupled adjacent the respective edges 210, 212 of the start frame 200 employing a snap-fit or other suitable connection. Integrally forming the electrical connectors 216, 218 and the cell tabs 22, 24 can eliminate the step of welding the cell tabs 22, 24 to the electrical connectors 216, 218 and minimize electrical resistance therebetween. The sixth electrical connector 218 of the start frame 200 cooperates with the second electrical connector 54 of the cooling module 30 of the adjacent repeating cell frame 12 to join together the start frame 200 and the cooling module 30, wherein the first side 202 of the start frame 200 faces the second side 36 of the frame 32 of the cooling module 30 and the third seal member 214 forms a substantially media tight seal therebetween.

A first connection terminal 220 is coupled to the third edge 210 of the start frame 200. The first connection terminal 220 is in electrical communication with the fifth electrical connector 216 and extends outwardly from the peripheral edge of the start frame 200. The first connection terminal 220 is adapted to provide an electrical connection with a high voltage cable in electrical communication with the associated electric device. In the illustrated embodiment, the first connection terminal 220 is a j-bar connection. It should be understood that other types of electrical connectors can be employed for the first connection terminal 220. The remaining structure and function of the start plate 200 is substantially similar to the spacer module 70 previously described herein.

Figure 8:
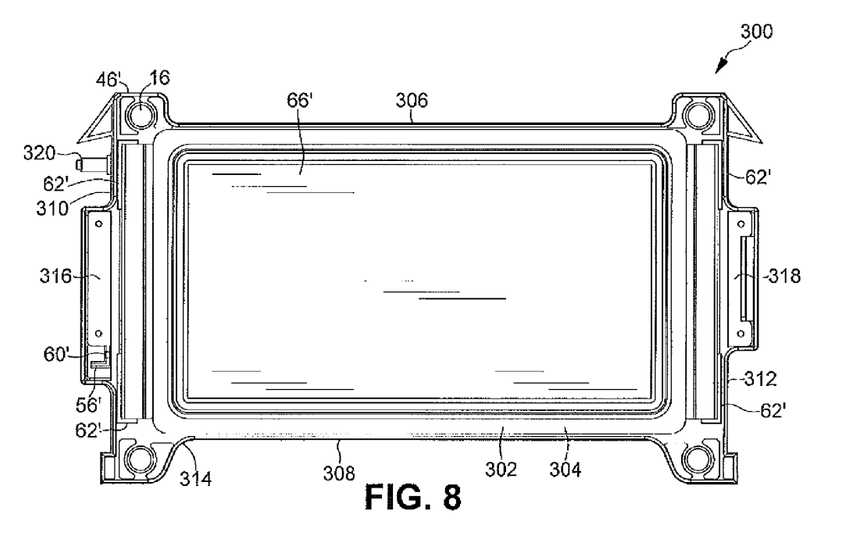
FIG. 8 is a plan view of a first side of the stop frame shown in FIG. 1.

As shown in FIG. 1, the stop frame 300 is disposed adjacent the second end of the battery pack assembly 10. The stop frame 300 is joined to the spacer module 70 of an adjacent repeating cell frame 12. Portions of the structure of the stop frame 300, more clearly shown in FIG. 8, are similar to the structure of the cooling module 30 illustrated in FIGS. 2-3. Structure similar to the cooling module 30 includes the same reference numeral and a prime (') symbol for clarity. The stop frame 300 includes a first side 302 and a second side 304. The frame 300 includes a first leg 306, a second leg 308, a third leg 310, and a fourth leg 312 forming an opening (not shown) through the central portion of the stop frame 300. In the illustrated embodiment, the stop frame 300 and the opening have a generally rectangular shape. It should be understood that the stop frame 300 and the opening may have other shapes such as square, circular, oval, and the like, for example, to substantially match similar shapes employed for the repeating cell frames 12. The stop frame 300 can be formed as a unitary frame by injection molding a material such as a nylon, polypropylene, metal, or other material having suitable physical and chemical properties, for example.

A fourth seal member 314 is disposed on the first side 302 of the stop frame 300 adjacent to an outer peripheral edge thereof. The fourth seal member 314 facilitates forming a substantially media tight seal adjacent the peripheral edge of the stop frame 300. The fourth seal member 314 can be formed from a material dispensed onto the stop frame 300 or preformed from a gasket material. An adhesive, or the like, can be employed to couple the fourth seal member 314 to the stop frame 300.

A seventh electrical connector 316 is disposed on the third leg 310 on the first side 302 of the stop frame 300 between the fourth seal member 314 and the opening formed in the stop frame 300. An eighth electrical connector 318 is disposed on the fourth leg 312 on the first side 302 of the stop frame 300 between the fourth seal member 314 and the opening formed in the stop frame 300. The seventh electrical connector 316 and the eighth electrical connector 318 are adapted to be coupled with the tabs 22, 24, respectively, of the battery cell 20. In the illustrated embodiment, the seventh electrical connector 316 is a substantially planer plate and the eighth electrical connector 318 is a female connector having a receiving portion facing outwardly from the second side 304 of the stop frame 300 adapted to slip-fit or snap-fit together with the male fourth electrical connector 94 of the spacer module 70 of the adjacent repeating cell frame 12. It should be understood that the eighth electrical connector 318 can be a male connector adapted to slip-fit or snap-fit together with a female connector. The electrical connectors 316, 318 are formed of a material such as an aluminum, a clad aluminum, a copper, or other electrically conductive material having suitable properties, for example, to facilitate a low electrical resistance connection with the respective tabs 22, 24 of the battery cell 20 and the fourth electrical connector 94 of the spacer module 70 of the adjacent repeating cell frame 12, wherein the electrical resistance is on the order of about 30 micro-Ohms. The tabs 22, 24 of the battery cell 20 can be coupled to the respective electrical connectors 316, 318 by resistance welding, laser welding, ultrasonic welding, soldering, brazing, and other coupling methods now known or later developed, for example, to obtain the low electrical resistance connection therebetween. Typically, the tabs 22, 24 are formed from different materials and the electrical connectors 316, 318 are formed from different materials, wherein the tab 22 and the seventh electrical connector 316 are formed from the same material and the tab 24 and the eighth electrical connector 318 are formed from the same material to facilitate forming the low electrical resistance welded connection therebetween. It should be understood that other combinations of materials can be used for the tabs 22, 24 and the electrical connectors 316, 318. The tabs 22, 24 of the battery cell 20 and the electrical connectors 316, 318 can be provided with a coating such as a tin coating, a silver coating, and a gold coating, for example, to facilitate forming low electrical resistance connections with the tabs 22, 24 and the electrical connectors 216, 218. It should be understood that the electrical connectors 316, 318 can be integrally formed with the cell tabs 22, 24, wherein the electrical connectors 316, 318 can be coupled to the respective legs 310, 312 of the stop frame 300 employing a snap-fit or other suitable connection. Integrally forming the electrical connectors 316, 318 and the cell tabs 22, 24 can eliminate the step of welding the cell tabs 22, 24 to the electrical connectors 316, 318 and minimize electrical resistance therebetween. The eighth electrical connector 318 of the stop frame 300 cooperates with the fourth electrical connector 94 of the spacer module 70 of the adjacent repeating cell frame 12 to join together the stop frame 300 and the spacer module 70, wherein the second side 304 of the stop frame 300 faces the first side 74 of the frame 72 of the spacer module 70 and the second seal member 90 forms a substantially media tight seal therebetween.

A second connection terminal 320 is coupled to the third leg 310 of the stop frame 300. The second connection terminal 320 is in electrical communication with the seventh electrical connector 316 and extends outwardly from the peripheral edge of the stop frame 300. The second connection terminal 320 is adapted to provide an electrical connection with a high voltage cable in electrical communication with the associated electric device. In the illustrated embodiment, the connection terminal 320 is a j-bar connection. It should be understood that other types of electrical connectors can be employed for the second connection terminal 320. The remaining structure and function of the stop plate 300 is substantially similar to the spacer module 70 previously described herein.

As shown in FIG. 1, the end frame 400 is disposed on and substantially covers the first side 302 of the stop frame 300, wherein one of the battery cells 20 is interposed between the first side 302 of the stop frame 300 and the end frame 400. The fourth seal member 314 forms a substantially media tight seal between the stop frame 300 and the end frame 400. In the illustrated embodiment, the end frame 400 has a generally rectangular shape to substantially match the shape of the repeating cell frame 12. It should be understood that the end frame 400 may have other shapes such as square, circular, oval, and the like, for example, to substantially match similar shapes employed for the repeating cell frames 12. The end frame 400 can be formed as a unitary frame by injection molding a material such as a nylon, polypropylene, metal, or other material having suitable physical and chemical properties, for example. Ears 402 are formed adjacent each corner of the end frame 400. One of the apertures 16 is formed in each of the ears 402.

To assemble the battery pack assembly 10, one of the battery cells 20 is coupled to the first side 34 of the frame 32 of each of the cooling modules 30, the first side 74 of the frame 72 of each of the spacer modules 70, the first side 202 of the start 200, and the first side 302 of the stop frame 300, wherein the tabs 22, 24 of the respective battery cells 20 are coupled to the electrical connectors 52, 54, 92, 94, 216, 218, 316, 318 of the cooling modules 30, the spacer modules 70, the start frame 200, and the stop frame 300, respectively. The repeating cell frames 12 are formed by joining together one of the cooling modules 30 and the spacer modules 70, wherein the first side 34 of the frame 32 of the cooling module 30 faces the second side 76 of the frame 72 of the spacer module 70. The first electrical connector 52 of the cooling module 30 is releasably joined to the third electrical connector 92 of the spacer module 70. The electrical connectors 54, 92 cooperate to place the battery cells 20 in electrical communication and facilitate joining together the cooling module 30 and the spacer module 70 to form the repeating cell frame 12. The repeating cell frame 12 is joined to the start frame 200, wherein the first side 202 of the start frame 200 faces the second side 36 of the frame 32 of the cooling module 30 of the repeating cell frame 12. The sixth electrical connector 218 of the start frame 200 is releasably joined to the second electrical connector 54 of the cooling module 30 to form an electrical connection therebetween and facilitate joining the start frame 200 to the repeating cell frame 12. The fourth electrical connector 94 of the spacer module 70 is releasably joined to the second electrical connector 54 of the cooling module 30 of the adjacent repeating cell frame 12, wherein the first side 74 of the frame 72 of the spacer module 70 faces the second side 36 of the frame 32 of the cooling module 30 of the adjacent repeating cell frame 12. The electrical connectors 54, 94 cooperate to place the battery cells 20 in electrical communication and facilitate joining together the cooling module 30 and the spacer module 70 of adjacent repeating cell frames 12. A plurality of the repeating cell frames 12 is joined together in like fashion to provide a stack of the repeating cell frames 12. The stop frame 300 is disposed on the last repeating cell frame 12 in the stack, wherein a first side 74 of the frame 72 of the spacer module 70 faces the second side 304 of the stop frame 300. The fourth electrical connector 94 of the spacer module 70 is releasably joined to the eighth electrical connector 318 of the stop frame 300 to form an electrical connection therebetween and facilitate joining the stop frame 300 to the spacer module 70 of the repeating cell frame 12. The end frame 400 is disposed on and substantially covers the first side 302 of the stop frame 300. The end plates 14 are disposed on opposing ends of the battery pack assembly 10. It should be understood that the end frame 400 can be followed by one or more additional series of the start frame 200, the repeating cell frames 12, the stop frame 300, and the end frame 400, wherein the end plates 14 are disposed at opposite ends of the battery pack assembly 10.

The tension rods 18 are inserted through the apertures 16 formed adjacent the corners of the end plates 14, the cooling modules 30, the spacer modules 70, the start frame 200, the stop frame 300, and the end frame 400 to provide a compressive force thereto. The compressive force places one face of each of the battery cells 20 in contact and in a heat transfer communication with at least one of the cooling fins 66; facilitates forming substantially media tight seals between abutting frames 32, 72, 200, 300, 400; and facilitates maintaining the frames 32, 72, 200, 300, 400 in the stacked relation.

The repeating cell frames 12, the start frame 200, the stop frame 300, and the end frame 400 provide an ease of assembly of the battery pack assembly 10, wherein a selected number of the repeating cell frames 12 can be employed to provide a desired electrical output to the associated electrical device. An ease of disassembly is also provided to facilitate servicing the battery pack assembly 10. Accordingly, a cost of manufacturing and servicing the battery pack assembly 10 is minimized. Further, the electrical connectors 52, 54, 92, 94, 216, 218, 316, 318 provide electrical connections between the battery cells 20 and the frames 32, 72, 200, 300, 400 having a low electrical resistance to maximize an efficiency of the battery pack assembly 10.

While certain representative embodiments and details have been shown for purposes of illustrating the invention, it will be apparent to those skilled in the art that various changes may be made without departing from the scope of the disclosure, which is further described in the following appended claims.

What is claimed is:

1. A repeating cell frame for a battery pack assembly comprising:
    a cooling module having a frame including a first side, an opposing second side, and a cooling fin disposed on the first side of the frame, a first electrical connector and a second electrical connector disposed on the frame of the cooling module, wherein a first battery cell includes a first side and an opposing second side and the second side of the first battery cell abuts the cooling fin and the first battery cell includes a first electrically conductive tab in electrical communication with the first electrical connector and a second electrically conductive tab in electrical communication with the second electrical connector; and
    a spacer module having a frame including a first side, an opposing second side, and an opening formed in the central portion thereof, the frame of the spacer module further including a third electrical connector and a fourth electrical connector disposed thereon, wherein a second battery cell includes a first electrically conductive tab in electrical communication with the third electrical connector and a second electrically conductive tab in electrical communication with the fourth electrical connector and at least a portion of the second battery cell received in the opening formed in the frame of the spacer module, the third electrical connector of the spacer module releasably joined to the first electrical connector of the cooling module causing electrical communication between the first battery cell and the second battery cell and placing the cooling module and the spacer module in a stacked relation to form the repeating cell frame;
    wherein the first side of the frame of the cooling module faces the second side of the frame of the spacer module and the first side of the first battery cell abuts the second battery cell.

2. The repeating cell frame according to claim 1, wherein one of the first electrical connector and the second electrical connector of the cooling module and one of the third electrical connector and the fourth electrical connector of the spacer module includes a voltage sensing lead in electrical communication therewith.

3. The repeating cell frame according to claim 2, wherein the voltage sensing lead includes a current limiting device.

4. The repeating cell frame according to claim 1, wherein the electrically conductive tabs of the first battery cell are coupled to the electrical connectors of the cooling module and the electrically conductive tabs of the second battery cell are coupled to the electrical connectors of the spacer module with one of resistance welding, laser welding, ultrasonic welding, soldering, and brazing.

5. The repeating cell frame according to claim 1, wherein the frame of the spacer module includes a thermistor disposed thereon adjacent the second battery cell.

6. The repeating cell frame according to claim 1, wherein the first electrical connector of the cooling module is a male connector and the third electrical connector of the spacer module is a cooperating female connector.

7. The repeating cell frame according to claim 1, wherein the second electrical connector of the cooling module is a female connector and the fourth electrical connector of the spacer module is a male connector.

8. The repeating cell frame according to claim 1, wherein at least a portion of the first battery cell is received in the opening formed in the frame of the spacer module.

9. A battery pack assembly comprising:
    a cooling module having a frame including a first side and a second side, a first electrical connector and a second electrical connector disposed on the frame of the cooling module, wherein a first battery cell abuts the first side of the frame and includes a first electrically conductive tab in electrical communication with the first electrical connector and a second electrically conductive tab in electrical communication with the second electrical connector;
    a spacer module having a frame including a first side, a second side and an opening formed in the central portion thereof, a third electrical connector and a fourth electrical connector disposed on the frame of the spacer module, wherein a second battery cell includes a first electrically conductive tab in electrical communication with the third electrical connector and a second electrically conductive tab in electrical communication with the fourth electrical connector and at least a portion of the second battery cell received in the opening formed in the frame of the spacer module, the third electrical connector of the spacer module releasably joined to the first electrical connector of the cooling module placing the cooling module and the spacer module in a stacked relation, wherein the first side of the cooling module faces the second side of the spacer module and the first battery cell abuts the second battery cell;

a start frame including a first side and a second side, a fifth electrical connector and a sixth electrical connector disposed on the start frame, wherein a third battery cell includes a first electrically conductive tab in electrical communication with the fifth electrical connector and a second electrically conductive tab in electrical communication with the sixth electrical connector, the sixth electrical connector of the start frame releasably joined to the second electrical connector of the cooling frame placing the cooling module and start frame in the stacked relation, wherein the first side of the start frame faces the second side of the cooling module and the third battery cell abuts the second side of the cooling module;

a stop frame including a first side and a second side, a seventh electrical connector and an eighth electrical connector disposed on the stop frame, wherein a fourth battery cell abuts a first side of the stop frame and includes a first electrically conductive tab in electrical communication with the seventh electrical connector and a second electrically conductive tab in electrical communication with the eighth electrical connector, the eighth electrical connector of the stop frame releasably joined to the fourth electrical connector of the spacer module placing the spacer module and stop frame in the stacked relation, wherein the first side of the spacer module faces the second side of the stop frame; and an end frame disposed on and substantially covering the first side of the stop frame.

10. The battery pack assembly according to claim 9, wherein one of the first electrical connector and the second electrical connector of the cooling module, one of the third electrical connector and the fourth electrical connector of the spacer module, one of the fifth electrical connector and the sixth electrical connector of the start frame, and one of the seventh electrical connector and the eighth electrical connector of the stop frame includes a voltage sensing lead in electrical communication therewith.

11. The battery pack assembly according to claim 10, wherein the voltage sensing lead includes a current limiting device.

12. The battery pack assembly according to claim 9, wherein the frame of the spacer module includes a thermistor disposed thereon adjacent the second battery cell.

13. The battery pack assembly according to claim 9, wherein the start frame includes a first connection terminal extending outwardly from a peripheral edge of the start frame, the first connection terminal in electrical communication with the fifth electrical connector of the start frame, and the stop frame includes a second connection terminal extending outwardly from a peripheral edge of the stop frame, the second connection terminal in electrical communication with the seventh electrical connector of the stop frame.

14. The battery pack assembly according to claim 9, including a plurality of seal members, wherein one of the seal members is disposed between each of the start frame and the cooling module, the cooling module and the spacer module, the spacer module and the stop frame, and the stop frame and the end frame.

15. The battery pack assembly according to claim 9, wherein the electrically conductive tabs of the battery cells are coupled to the electrical connectors of the start frame, the cooling module, the spacer module, and the stop frame with one of resistance welding, laser welding, ultrasonic welding, soldering, and brazing.

16. A battery pack assembly comprising:
  a plurality of repeating cell frames, each repeating cell frame including:
    a cooling module having a frame including a first side and a second side, a first electrical connector and a second electrical connector disposed on the frame of the cooling module, wherein a first battery cell abuts the first side of the frame and includes a first electrically conductive tab in electrical communication with the first electrical connector and a second electrically conductive tab in electrical communication with the second electrical connector; and
    a spacer module having a frame including a first side, a second side and an opening formed in the central portion thereof, a third electrical connector and a fourth electrical connector disposed on the frame of the spacer module, wherein a second battery cell includes a first electrically conductive tab in electrical communication with the third electrical connector and a second electrically conductive tab in electrical communication with the fourth electrical connector and at least a portion of the second battery cell received in the opening formed in the frame of the spacer module, the third electrical connector of the spacer module releasably joined to the first electrical connector of the cooling module to form one of the repeating cell frames, wherein the first side of the cooling module faces the second side of the spacer module and the first battery cell abuts the second battery cell, and the fourth electrical connector of the spacer module is releasably joined to the second electrical connector of a cooling module in an adjacent repeating cell frame placing the repeating cell frames in a stacked relation, wherein the first side of the spacer module of one repeating cell frame faces the second side of the cooling module in the adjacent repeating cell frame;
  a start frame including a first side and a second side, the first side of the start frame in facing relationship with the second side of the cooling module of an adjacent repeating cell frame and the first side of the start frame defining a first terminal end of the battery pack assembly, a fifth electrical connector and a sixth electrical connector disposed on the start frame, wherein a third battery cell includes a first electrically conductive tab in electrical communication with the fifth electrical connector and a second electrically conductive tab in electrical communication with the sixth electrical connector, the sixth electrical connector of the start frame releasably joined to the second electrical connector of the cooling module having a second side in facing relationship with the first side of the start frame, wherein the third battery cell abuts the second side of the cooling module that is in facing relationship with the first side of the start frame;
  a stop frame including a first side and a second side, the second side of the stop frame in facing relationship with the first side of the spacer module of an adjacent repeating cell frame, a seventh electrical connector and an eighth electrical connector disposed on the stop frame, wherein a fourth battery cell abuts the first side of the stop frame and includes a first electrically conductive tab in electrical communication with the seventh electrical connector and a second electrically conductive tab in electrical communication with the eighth electrical connector, the eighth electrical connector of the stop frame releasably joined to the fourth electrical connector of the spacer module having a first side in facing relationship with the second side of the stop frame; and an end frame disposed on and substantially covering the first side of the stop frame, wherein the end frame defines a second terminal end of the battery pack assembly.

17. The battery pack assembly according to claim 16, wherein one of the first electrical connector and the second electrical connector of the cooling module, one of the third electrical connector and the fourth electrical connector of the spacer module, one of the fifth electrical connector and the sixth electrical connector of the start frame, and one of the seventh electrical connector and the eighth electrical connector of the stop frame includes a voltage sensing lead in electrical communication therewith, the voltage sensing lead including a current limiting device.

18. The battery pack assembly according to claim 16, wherein at least one of the spacer modules includes a thermistor disposed thereon adjacent the second battery cell.

19. The battery pack assembly according to claim 16, wherein the start frame includes a first connection terminal extending outwardly from a peripheral edge of the start frame, the first connection terminal in electrical communication with the fifth electrical connector of the start frame, and the stop frame includes a second connection terminal extending outwardly from a peripheral edge of the stop frame, the second connection terminal in electrical communication with the seventh electrical connector of the stop frame.

20. The battery pack assembly according to claim 16, including a plurality of seal members, wherein one of the seal members is disposed between each of the start frame and the cooling module, the cooling module and the spacer module, the spacer module and the stop frame, and the stop frame and the end frame.

* * * * *